Feb. 4, 1969   J. W. DAWSON   3,425,258
STRETCH FORMING
Filed Oct. 22, 1965   Sheet 1 of 2
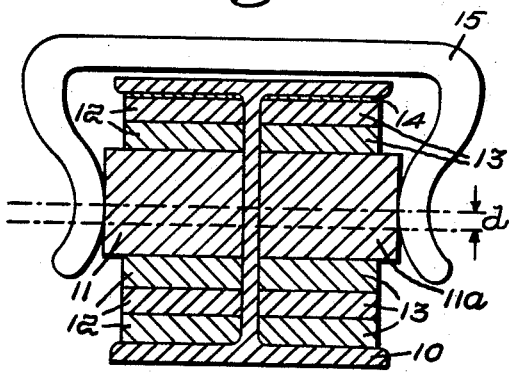
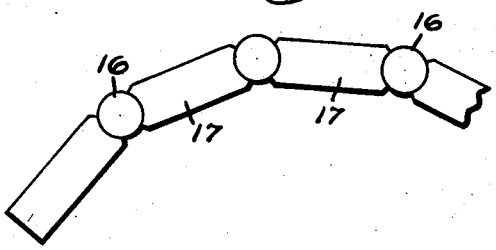
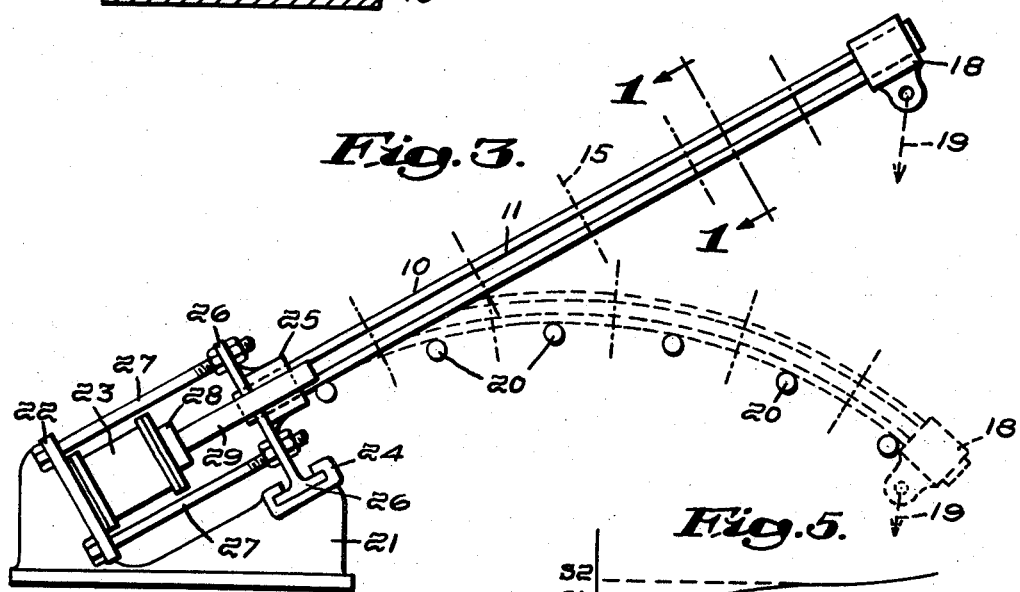
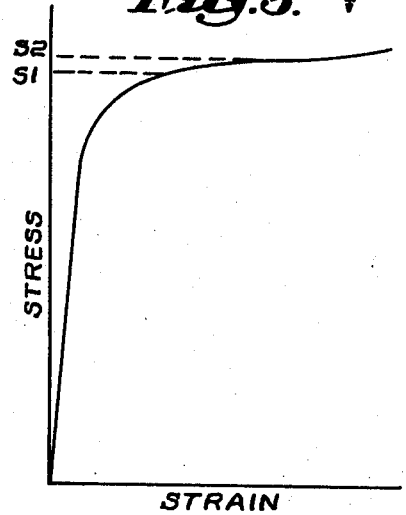
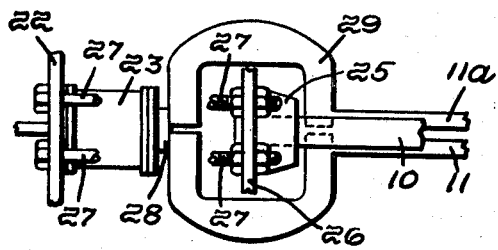
Inventor:
John W. Dawson,
By Russell, Chittick & Pfund   Attorneys

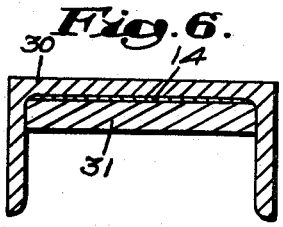
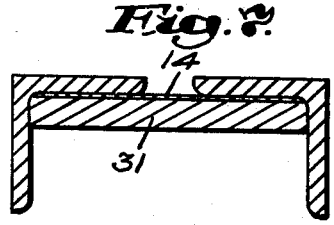
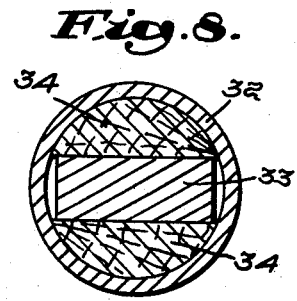
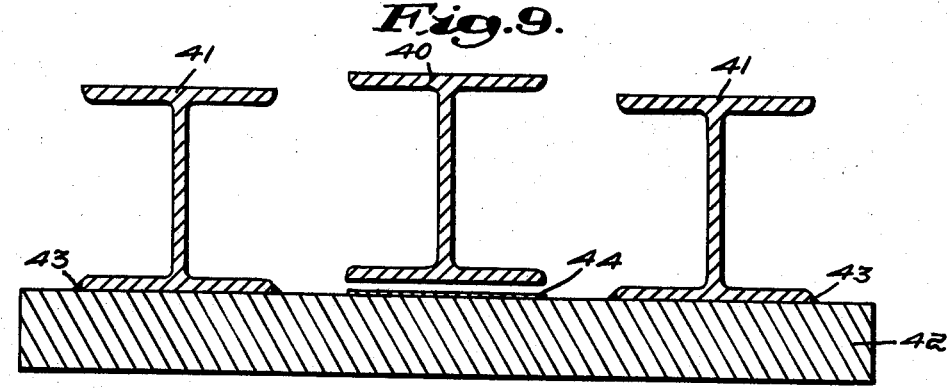
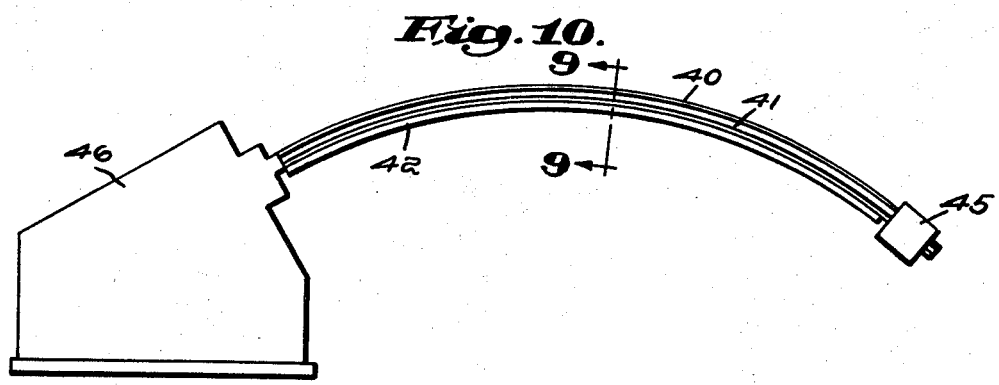

United States Patent Office 3,425,258
Patented Feb. 4, 1969

3,425,258
STRETCH FORMING
John W. Dawson, Winter St., Norwell, Mass. 02061
Filed Oct. 22, 1965, Ser. No. 501,090
U.S. Cl. 72—303
Int. Cl. B21d *11/04, 31/00, 1/04*
10 Claims

ABSTRACT OF THE DISCLOSURE

A method for stretch forming a beam places the beam in tension beyond its yield point with the force reacted as compression in a column stressed below its yield point and lying along the beam. A relatively small transverse force for deflecting the column and beam in the stressed condition conforms the beam to the desired shape and produces the desired permanent set in the beam due to further stressing resulting from the deflection.

---

This invention relates to the relatively new art of shaping long metal work-pieces such as sheets, tubes, structural members etc., by stretching them over a form block or die thus setting them to contour. The underlying principle of this stretch forming process is that the metal is stretched beyond its yield point where it enters the plastic range and retains the formed curvature with very little spring-back. Use of the process is increasing as it provides some prime advantages versus the factors; spring-back, wrinkles, die costs and operator training. Furthermore, the stretching generally work-hardens the material to high strength.

Heavy machinery is, however, required to apply stretch forming according to the prior art, especially so when the stretched piece is of large cross-sectional area. For example a steel I beam of three square inches section may require 120,000 pounds tension. Typical machines require rugged bed members thruout their length since hydraulically-actuated pulling cylinders pivot-mount at each end of the bed and stretch the work-piece located several feet above it. Furthermore, the die may be pushed upward by hydraulic actuators against center of the work-piece while it is under stretch tension. It is readily seen then, that substantially the entire machine must withstand high magnitude forces and mechanical moments resulting therefrom.

It is accordingly a prime object of this invention to provide improved methods and machinery to the process of stretch forming that will make possible the use of much lighter weight machine frames. These improvements are particularly applicable to forming parts of single-curvature although useful also to forming certain compound curvatures.

Another prime object is to so reduce the reaction froces against the face of the forming die block that the die structure also may be of light weight inexpensive construction and, furthermore, much better permitting the use of adjustable dies as will be later described.

Another object is to simplify procedures and machinery as, for instance, removing need to move the relative locations of die and pulling forces during the stretching operation.

Other objects will appear hereinafter.

These objects are achieved through the use of flexible column members fixed to stay close alongside (or within) the work-piece thruout its length and thruout the forming operation. This composite column is made stronger than the work-piece and it withstands essentially all of the compressive reaction to the tensile force applied to stretch the piece while the column compresses only resiliently. The composite column in compression and the work-piece in tension due to the force transmitted by the compression in the composite column constitutes what is herein referred to as a couple. When, at any cross-section of the couple, the centers of gravity of the work-piece cross-sectional area and the column cross-sectional area are made to lie co-incident, then the tensile and compressive forces can directly generate no mechanical moments, nor other force reactions upon the die and upon the machine excepting at the extreme ends of the couple. It remains thereafter only to apply small forces to deflect the couple thereby flexing the composite column and permanently forming the work-piece while the latter is in the plastic range. The essential advantage thus gained is to isolate, in large part, stretching forces from forming forces and thru this, achieve the principal objects of this invention.

The features and objects of the invention will be understood from the following detailed description taken in conjunction with the accompanying drawings wherein:

FIG. 1 is a sectional view taken on line 1—1 of FIG. 3, of a steel I beam work-piece together with two central column members, lying on either side of the web and between flanges of the beam.

FIG. 2 shows a side view, to smaller scale, of a sectionalized and hinged "flexible" column member as may be used in FIG. 1 to form a two-member composite column.

FIG. 3 shows the essential parts of a light weight stretch forming machine equipped to form the I beam of FIG. 1 into a circular arc; the formed position is shown by dotted line.

FIG. 4 shows a top normal-to-cylinder view of the near end of FIG. 3 and illustrates method of applying push force, around the beam holding clamp, to the column-ends.

FIG. 5 shows a typical stress-strain curve of structural steel.

FIG. 6 shows a channel-column couple section similar generally to FIG. 1, but using a single column member. This couple is particularly adapted to aluminum or thin steel channel sections.

FIG. 8 shows a tube-column couple section with wooden spacers holding the column centered.

FIG. 9 shows section of a couple pre-formed prior to use.

FIG. 10 shows essential parts of a machine operating on the couple of FIG. 9.

Referring now to FIG. 1, this shows cross-section at line 1—1 of FIG. 3 of work-piece and composite column assembled into a force couple as is typical to practicing the method of this invention. The work-piece is here a steel (or aluminum) I beam 10. Two identical column members 11 and 11a (to be later defined) assemble, one on either side of the beam web as shown. These members are spaced between the beam flanges, on each side, by five metal filler strips 12 and 13. It will be noted that the center of gravity of the two column cross-sections is here slightly displaced from the center of gravity of the work-piece; this is to impart a small moment halpful to forming as will be later explained. It is, however, not essential to the prime objects of this invention that the centers of gravity be offset from co-incident. A drive-on clamp 15 holds the two column members 11 firmly against the web of beam 10. It is to be understood that neither tension or compression is to be applied to the filler strips 12. It is to be further understood that the couple of FIG. 1 is organized for forming the beam 10 into a continuous arc (of constant or varying radii) on the apparatus of FIG. 3.

FIG. 3 shows essential parts of a stretch forming machine employing the methods of this invention and operating upon the couple whose section, at line 1—1, is shown by FIG. 1. The work-piece 10 has attached to its far end a strong pulling clamp 18 which grips the piece for stretching thru the action of tapered and toothed jaws etc. as used to grip pieces and apply tension in the prior art stretch forming apparatus. The clamp 18 could also be a force-applying hydraulic cylinder actuator, such as the assembly shown mounted integrally with frame 21, to suspend freely from the couple at the location of clamp 18 and there apply push and pull forces to the couple so that actuation is provided at both ends of the couple. This alternative constitutes an active clamp between ends of the column members and end of the work-piece and should be construed as within the scope of the claims whenever the clamping of the remote ends of the members is recited. The columns 11 are pushed axially against the clamp 18 to apply stretching force to the beam while hoist tackle of any suitable sort may attach to clamp 18 and apply a side force, as symbolized by arrow 19, to bend and form the piece against six stop-pins 20 as indicated by dotted line. It is to be understood that a plurality of such forming forces as 19 may be applied to the couple at points intermediate to the couple ends. The stop-pins 20 mount on a machine framework not shown. It will be seen that the stretching force as applied thru the pushing columns is automatically and continuously oriented in direction to act parallel to the work-piece longitudinal fibres. The drive-on clamps 15 are shown applied, by dot-dash lines, to five locations spaced along the couple. These clamps serve not only to hold together the couple-assembly but also to maintain the column members 11 against buckling while they are under heavy compression. It will be apparent that other forms of clamps may be used as ordinary screw-tightened C clamps or, alternatively, toggle clamps extending entirely around the couple.

Turning now to the near (left) end of the machine of FIG. 3, this shows a welded steel actuator mount 21 bearing on its left end a strong faceplate 22 for supporting a hydraulic push-cylinder actuator 23 and on its right end a loose fitting guideway 24 for positioning a pulling-clamp 25, until its flanges 26 are tied to the base plate flange 22 by the four strong pull-bolts 27. Pushing force is applied to the near ends of columns 11 by an hydraulically-actuated piston 28 thru two C-shaped members 29 which bridge around the stationary clamp 25.

FIG. 4 shows a partial top view of the near-end assembly of FIG. 3 normal to line of action of the actuator and illustrating more clearly the above-mentioned bridging action of the members 29. It is thus seen that the stretching-force reactions are essentially confined to mechanical loops in the immediate vicinity surrounding the hydraulic actuator, so far as the stretch machine proper is concerned. Therefore the actuator mount 21 may be attached to the machine framework, not shown, by a light-duty pivot allowing the actuator to be easily oriented to accommodate various types of work-pieces and various formed curvatures of the pieces, other than as shown.

Proceeding now to an examination of the forces which act against the die, we may first refer to the prior art of stretch forming. According to the prior art, the work-piece is stretched over the die without benefit of being assembled into a couple and the stretching force therefore generates a pressure type force acting against the convexly-curved face wherever the piece rests against it, precisely as a string wound tightly upon one's finger, generates a squeezing pressure upon it. These pressure type forces may react heavily against the die; for example a typical four-inch steel I beam, while being stretch formed according to the prior art and to a forty foot radius of curvature, may generate a force against the die face amounting to three thousand pounds under each lineal foot of beam length. Proceeding, on the other hand, according to the method of this invention, the work-piece is assembled into a couple wherein the composite column, curved with the work-piece and working under a compressive force equal to the tensile force applied to the piece, generates a counter-pressure against the piece which is equal in magnitude but opposite in direction to the pressure type force generated by the piece. In so doing the curved column acts as does a structural arch, carrying load thru compressive reaction. Thus the die face is relieved entirely of the above-described pressure loadings; the column has, in effect, become part of the die. It can now remain only for the die proper to exert low magnitude forces to form the couple into desired curvature while the work-piece is in plastic state.

Several advantages, as regards the die proper, are achieved by unloading the pressure type forces in the manner above described. One advantage is that die structure can be made of light weight members. Another advantage is that the die face may be made discontinuous, as shown in FIG. 3 where the die is constituted of periodically-placed pins 20. Still another advantage is that the die is now easily made adjustable as, for example, by providing for moving and re-clamping pins 20 to other positions on the machine frame.

In further reference to FIG. 1, it will now be apparent that strong pressure type forces will act within the couple during the forming operation, these forces acting in a vertical direction to squeeze the upper four filler strips 12 between the upper flanges of work-member 10 and column members 11. At the same time there is relative motion in the direction of the beam extension, normal in FIG. 1 to the paper, between elements 10, 11, and 12 of the couple when it is being bent. To illustrate, the upper beam flange will be stretched more than the lower flange throughout the formed length. Accordingly a heavy lubricant 14, as is used between piece and die in the prior art, is applied between members at the locations indicated on FIG. 1. The lubricant 14 may be a wax-impregnated cardboard strip assembled between beam-flange and filler-strip and compensating for rough beam surfaces.

In still further reference to FIG. 1, the center of gravity of the columns is shown displaced by a small dimension ($d$) from the center of gravity of the work-piece. This is done to bring out of the couple a small mechnical moment amounting to the product of ($d$) and the stretching force, as is helpful to bending of the couple into desired form. Such employment of the stretching force constitutes still another feature of this invention.

In still further reference to FIG. 1, it will be noted that cross-sectional area of the two columns is twice that of the beam work-piece. Thus, columns and beam may be of the same material without permanent compressive deformation taking place in the columns, and permitting their repeated use. The columns 11 and 11a may be continuous steel bars throughout their length and even so, weaker in flexture than the beam due their sectional shape while, at the same time, twice as strong in tension or compression. Alternatively, the columns 11 may be built up of strips similarly to fillers 12 or, as another alternate, the columns may be segmented (see FIG. 2) to reduce "forming" forces and to facilitate couple disassembly after forming. These features are referred to in the claims as having a low moment of inertia with respect to the neutral axis of bending of the column.

FIG. 2 shows side view, to smaller scale, of a segmented and hinged column member such as may be used in FIG. 1. Here column pivots 16, shown end view, are in the form of short steel cylinders against which the rectangular column sections 17 are machined to fit as shown.

FIG. 5 shows a typical mild steel stress-strain diagram as commonly obtained from sample tests. The linear part of this diagram represents resilient strain below the yield point whereas the stress magnitude labelled S–1 will impart some plastic flow. It is readily seen that small-magnitude differentials in stress, as from S–1 to S–2, will cause large magnitude differentials in strain. This indicates the advantage of isolating stretching forces from forming forces and illustrates, in part, why stop pins 20 of FIG. 3 may be positioned by a light machine framework and similarly why force 19 of the same figure may be relatively very small.

Again referring to FIG. 1 with respect to prior explanation and to FIG. 5, it will be apparent that relatively large pressure type force will act downward, FIG. 1, on the lower flange component of beam 10 while it is under stretching tension and supported mainly by cantilever action from the web. This cantilever load will generate in the flange-web junction, tensile and compressive stresses acting at right angles to the beam length dimension. Therefore these stresses add to the stretching stress in right-angle vector relationship and normally effect only minute change in total applied stress magnitude.

FIG. 6 similarly to FIG. 1, shows section of a couple suitable to forming channel sections where the channel work-piece 30 is formed over a sigle column 31. Here center of gravity of the channel may fall in such position as not to permit use of a column of larger area than the channel and having its center of gravity at the same point as that of the channel. Particularly this may be true for thick-walled channel. In such cases the column may still be made well stronger than the channel by using a material of higher yield point. Alternatively, the column area may arbitrarily be made larger by, for instance, increasing the vertical dimension of 31 in FIG. 6. This causes offset of centers similarly to the offset ($d$) of FIG. 1 but in an anti-forming direction. In such cases it is necessary to add to the "Forming forces" a component to offset this small adverse moment which has been brought out of the couple.

FIG. 7, similarly to FIG. 6, shows a couple for forming two angle sections upon a single column. If identical shaping is desired on the angles the curvature must be a constant radius arc.

FIG. 8, shows again similarly, a couple section for forming a tubular section piece 32 over column 33 and spaced by "half round" wooden members 34 into curvatures lying in a single plane. Here again also center of piece and column are shown co-incident.

From the foregoing descriptions it will be seen that the methods of this invention may apply to forming pieces of sectional shapes other than those shown, and to forming those shown into curvatures in other directions than is illustrated in FIG. 3. Also it will be seen that a single piece, as that shown in FIG. 3, may in one operation be formed into various curvatures which do not all lie in a single plane by, for instance, deflecting the clamp 18 out of the plane of the paper during part of the forming operation. In such forming, out of a single plane, the couple of FIG. 8 would preferably employ a resilient circular-section column or a segmented rod column with ball-and-socket joints or the equivalent, not preferably to deflection in any one direction and so might the design of other couples be similarly influenced. Likewise the "die" stop pins 20 and forming forces 19 of FIG. 3 may be arranged and extended into three dimensions versus two so as accommodate forming into the desired curves lying in different planes.

The foregoing has, furthermore, been confined to depicting a single preferred form of the force "couple" by which this invention may provide improvement to the stretch forming art whereas other forms fall within scope of the invention. The couples previously shown herein are assembled prior to any forming whatsoever using straight column and work-piece members to make up the couple. It is, however, practicable and still advantageous to some degree to first pre-form the work-piece to approximately the desired contour using other than stretch forming methods as, for example, conventional three-roller bending and thereafter to set the work-piece to final smooth precision contour as well as to higher work-hardened state by stretch forming again using simple and light weight apparatus according to the methods of this invention. The couples thus employed in this alternative forming procedure are assembled upon the curved die face as in the manner illustrated by FIG. 9 and FIG. 10 herewith.

Referring primarily to FIG. 9, this shows cross-section of a curved couple, as taken from any such location as line 9—9 on FIG. 10. A work-piece I beam 40 is shown by FIG. 9 to lie reasonably close to (or upon) a die face-plate member 42 and between two column members 41 which may each be of the same section as the work-piece but accurately pre-formed and strongly attached to the die face-plate 42, as by the welding fillets 43. Between beam 40 and the face plate a lubricating strip 44, similar to 14 of FIG. 1, is shown. The face plate 42 must be relatively strong against transverse cantilever action, in the plane of the paper in FIG. 9, since it must sustain the pressure like force exerted downward by the curved work-piece 40 while under stretch-tension and the corresponding upward pressure force exerted by the two column members 41 while under compression. However thruout the length dimension of the die, lying in the plane of the paper in FIG. 10 the die face plate need not sustain the heavy axial loading or moment loadings. Thus it is seen that all major force reaction are again here confined within the couple excepting at the extreme ends.

Referring now to FIG. 10, this further illustrates the assembled curved couple whose cross-section at line 1—1 has been shown by FIG. 9. Similarly to FIG. 3, FIG. 9 shows a clamp 45 applied at the remote end of the couple and similarly also the entire near-end apparatus of FIG. 3 is shown indicated by assembly 46. This assembly 46 acts upon the near end of the couple, to applying pressure against the ends of column members 41 and tension upon work-piece 40, using mechanism members entirely similar to those of FIG. 3 previously described. Again, both the die structure as shown and the assembly 46 as shown are mounted to a machine frame structure not shown.

I claim:
1. The method of stretch forming an elongated metal member comprising the steps of
   (a) locating along said member at least one elongated column, said column having a higher absolute yield point than said member and a low moment of inertia with respect to the neutral axis of bending of said column,
   (b) securing the end of said column to said member at the remote end of said member,
   (c) placing said member under tensile stress by applying axial compressive stress to the near end of said column relative to the near end of said member,
   (d) increasing said tensile stress in said member to above the yield point for said member but below the yield point for said column, and
   (e) applying a bending stress to said member and column while the increased tensile stress is applied to said member to deform said member to the desired shape with the bending of said member increasing the tensile stress on one side of the neutral axis of bending of said member further beyond the yield point to produce a permanent set in said member when said tensile and bending stresses are removed, while not permanently deforming said column.

2. The method of stretch forming according to claim 1 excepting that said tensile and bending stresses are not removed in step (e) and there is added an additional step,
   (f) further increasing said tensile stress in said member still further beyond the yield point of said member to produce a more precise form to the permanent set of said member and to more fully work-harden the material of said member when said tensile and bending stresses are removed, while not permanently deforming said column.

3. The method of stretch forming according to claim 1 in which the said increased tensile stress of step (d) is still further increased when the said bending stress in step (e) is applied.

4. The method of stretch forming according to the method of claim 1 excepting that a bending stress is applied to said member and column when said member is placed under tension in step (c), said bending stress being thereafter maintained thru step (c) and into step (d) of claim 1 in the same magnitude as used in step (d) of claim 1 and thereby finally deforming said member to produce permanent set during step (d) of claim 1.

5. The method of stretch forming according to claim 1, wherein said bending stress is applied in part to said member by forming die elements which engage against said member and said column only at spaced intervals along the elongated length of said member and said column.

6. The method of stretch forming according to claim 5 in which said forming die elements are adjustably mounted to a support frame.

7. The method of stretch forming according to claim 1, wherein the centers of gravity of the cross-sections of said column and said member are co-incident.

8. The method of stretch forming according to claim 7 wherein the said centers of gravity of column and member are spaced apart along radius of the curvature to which said member and said column are to be formed and with center of gravity of the column falling at greater distance along said radius than center of gravity of the member.

9. The method of forming an elongated metal member which has been pre-formed to approximately the desired contour and placed against a forming die which has a face corresponding to the desired final contour comprising the steps of:
  (a) fitting at least one elongated column having higher absolute yield point than said member over said face of said forming die and attaching said column firmly to said die face with the pre-formed member lying along said column;
  (b) securing the ends of said column to said member at the remote end of said member;
  (c) placing said member under tensile stress by applying axial compressive stress to the near end of said column relative to the near end of said member; and
  (d) increasing said tensile stress in said member to above the yield point of said member, but below the yield point of said column, and stretching said member into continuous engagement along the die-face producing a permanent set in said member after said tensile stress is removed, with permanent deformation of said column or said die.

10. The method of forming an elongated member made of material having the property of a yield point comprising the steps of:
  placing said member along at least one elongated column, said column having a higher absolute yield point than said member and a low moment of inertia with respect to the neutral axis of bending of said column,
  securing the end of said column to said member at the remote end of said member,
  applying equal and opposite axial tensile and compressive stresses to the near ends of said column and member,
  increasing said stresses to above the yield point for said member but below the yield point for said column, and
  applying a bending stress to said member and column while the increased stresses are applied to deform said member to the desired shape with the bending of said member increasing the stress on one side of the neutral axis of bending of said member further beyond the yield point to produce a permanent set in said member when said axial and bending stresses are removed, while not permanently deforming said column.

References Cited

UNITED STATES PATENTS

| 2,887,143 | 5/1959 | Ahonen | 72—303 |
| 3,274,817 | 9/1966 | Anderson | 72—311 |

CHARLES W. LANHAM, *Primary Examiner.*

RONALD D. GREFE, *Assistant Examiner.*

U.S. Cl. X.R.

72—311, 378